June 10, 1941.   R. A. K. FLEISCHMANN   2,245,393
DEMAND INDICATOR
Filed Nov. 6, 1939

Inventor
Rudolph A. K. Fleischman
By Shepherd & Campbell
Attorneys

Patented June 10, 1941

2,245,393

UNITED STATES PATENT OFFICE 2,245,393

DEMAND INDICATOR

Rudolph A. K. Fleischmann, Philadelphia, Pa., assignor to The Eastern Specialty Company, Philadelphia, Pa., a corporation of Pennsylvania Application November 6, 1939, Serial No. 303,136

9 Claims. (Cl. 171—34)

This invention relates to improvements in demand indicators and recorders particularly adapted for use in conjunction with electric meters but also having a wide range of usefulness in conjunction with meters for measuring flow and/or consumption of other values such as steam, water, gas, oil, air, etc.

The main purpose of the device is to provide means whereby any of the following quantities or rates may be measured, indicated and recorded, separately or in combination:

1. The instantaneous flow rate (consumption rate) or so-called "demand" at any prevailing instant.

2. The maximum demand which has occured at any time since the time of last resetting of the device.

3. The maximum demand which has occurred at any time during the elapsed interval between the time of last resetting, and the time of the preceding resetting.

The elapsed interval between resettings of the device is referred to by those skilled in the art as a meter-reading period or billing period.

For purposes of illustration, assume that a meter-reading period extends from the first day of each calendar month to the first day of the next succeeding month. On that day the meter reader makes a note or record of the instrument reading or readings and then resets the instrument indications back to zero. At any time whatever, the meter readings may be inspected visually and noted by the customer on whose premises said meter is located.

Assume the customer to inspect his meter visually on November 9th for the purpose of ascertaining the prevailing demand rate at the moment of inspection. The demand indicator herein described will at that time indicate the following values:

1. The prevailing demand at the moment of inspection.

2. The maximum demand which has occurred at any time between November 1st and November 9th; which value of demand may or may not be exceeded by subsequent demands occurring during the current billing period, which extends from November 1st to December 1st, and 3. The maximum demand which has occurred at any time during the previous billing period; to wit: from October 1st to November 1st.

The device will thus give a record and indication which extend over a maximum period of time of two billing periods, which in the case illustrated happens to be two successive months, but which may be two successive periods of time of any other duration, greater or less than a month, depending upon the particular times at which the meter reader happens to reset the device.

Further purposes will appear from a consideration of the accompanying description and the drawing, in which.

Like numerals designate corresponding parts throughout the several figures of the drawing.

Figure 2:
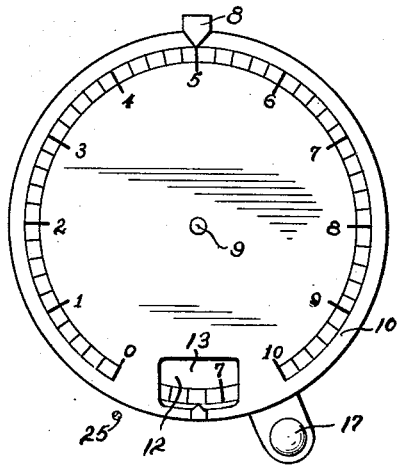
Fig. 2 is a face view looking toward the right in Fig. 1.
Figure 1:
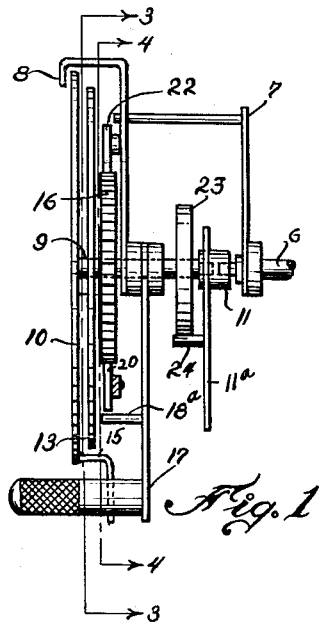
Figure 1 is a side view showing the essential operating parts of the device.
Figure 3:
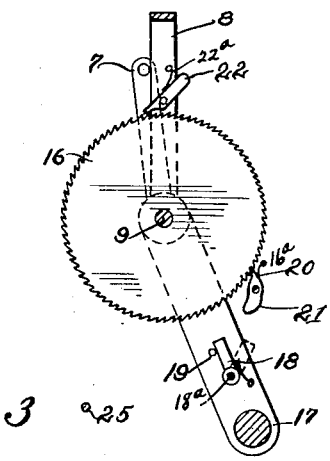
Fig. 3 is a sectional view along the line 3—3 of Fig. 1.

Referring to the drawing, a primary operating pusher shaft 6 is in operative connection with the demand responsive element of the meter or may itself represent such demand responsive element of any type of meter such as a steam, water, gas, air, oil or electric meter. This structure is well adapted to act in conjunction with the ampere demand indicator illustrated in the co-pending application of Kenneth C. Markley, Serial No. 302,447 filed on the first day of November, 1939.

The shaft 6 may move up and down scale in such a manner that it closely follows variations in the demand of the metered quantity at all times, or else shaft 6 may be moved in an upscale direction at a rate of speed proportional to the prevailing quantity consumption rate, being returned or reset periodically to zero, as in a so-called block interval type of meter. In either case, shaft 6 either reaches, or is periodically advanced, to a position corresponding to the prevailing demand or consumption rate, in a manner familiar to those skilled in the art.

Shaft 6 terminates in a pusher stud 7 which may engage, by mechanical contact, one side of a frictionally mounted pointer 8. Friction pointer 8 is mounted upon a shaft 9, the latter being journaled at its forward end in a fixed scale 10 and at its rear end in a bearing 11. Pointer 8 revolves about shaft 9, with a predetermined amount of friction, when pushed in an upscale direction by stud 7, and at all other times retains its angular position relative to shaft 9. Bearing 11 is carried by a fixed bracket 11ª.

The fixed scale 10 is provided with an opening or window 12 through which is visible a portion of the graduations and numbers of a movable scale 13, the latter scale being firmly fixed to shaft 9. An ear or projection 14, attached to scale 13, is arranged to abut a fixed stop 15, to provide a positive zero setting position for scale 13. A ratchet wheel 16 is affixed to shaft 9, and thus scale 13, shaft 9 and ratchet wheel 16 rotate together as a unit.

Figure 4:
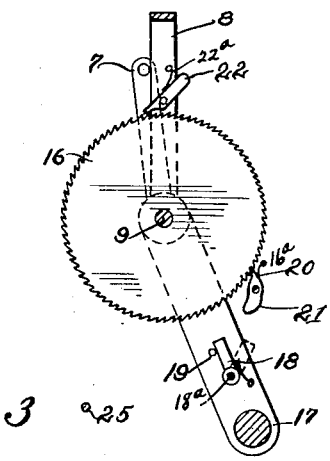
Fig. 4 is a sectional view on line 4—4 of Fig. 1, with parts omitted.

A resetting lever 17 is pivotally and loosely mounted upon shaft 9 and carries a detent 18, that is pivoted on pin 18a and retained in the position shown in Fig. 4 by a light spring which causes said detent to bear against a stop 19. A fixed pawl or dog 20 is retained in contact with the teeth of ratchet wheel 16 by means of a spring 16a and may be lifted out of engagement with ratchet wheel 16 against the tension of said spring when pressure is applied to the disengagement hump 21.

Figure 5:
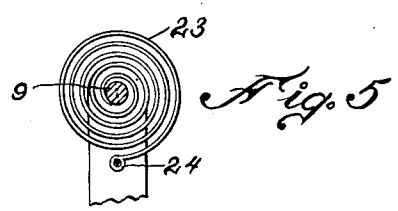
Fig. 5 is a view of the reset spring hereinafter described.

A movable pawl or dog 22 is secured to friction pointer 8 and is maintained by a light spring 22a in such a position (see Fig. 4) that the end of dog 22 is normally held out of engagement with the teeth of ratchet wheel 16 but may be brought into engagement with said teeth by pressure upon the upper end of said dog. A spiral return spring 23 is anchored upon shaft 9 with its outer end fixed to stud 24, and tends to apply a continuous torque upon shaft 9 in a clockwise direction. (See Fig. 5.)

The operation of the device is as follows:

Assume all indications to be initially set at zero, i. e., with friction pointer 8 set against fixed stop 25 and indicating a value of zero against scale 10, and with movable scale 13 indicating a reading of zero when viewed through window 12. Subsequent motions of pusher 7 in a clockwise direction (Fig. 4) will advance friction pointer 8, leaving the latter at the position of maximum travel of pusher 7 and indicating the corresponding value of maximum demand on scale 10, said value of indicated demand being the maximum up to date, during the current billing period.

At the end of said billing period, the meter reader resets the device by rotating lever 17 in a counter-clockwise direction. During the first part of its travel, lever 17 moves into position so that detent 18 rides over and presses upon hump 21 of pawl 20, thereby lifting pawl 20 out of engagement with ratchet wheel 16. As soon as this occurs, spring 23 is free to rotate the unit consisting of shaft 9, ratchet wheel 16 and scale 13 in a clockwise direction, bringing ear 14 against stop 15 so that scale 13 will give a reading of zero as viewed through window 12. In case scale 13 is already in the zero position, the release of pawl 20 as described will cause no further motion of scale 13.

Continued counter-clockwise motion of lever 17 will move detent 18 free of pawl 20, permitting the latter to come back into engagement with ratchet wheel 16. Upon further travel of lever 17, detent 18 comes up against the free end of pawl 22, pressing the latter into engagement with ratchet wheel 16, whereupon further motion of lever 17 will rotate ratchet wheel 16 (and with it scale 13) through an angle which is equal to the angle through which pointer 8 must be moved in order to return the latter to zero. In other words, when pointer 8 is reset from a given value to zero, scale 13 is moved up from its zero by an equal amount, so that, in effect, the demand reading is removed from pointer 8 and transferred to scale 13, said demand reading then remaining upon scale 13 until the next subsequent resetting operation a month hence.

During the latter part of the motor of lever 17, the teeth of ratchet wheel 16 slip by under pawl 20, and at the limit of travel of scale 13, pawl 20 locks ratchet wheel 16 in that position. The return of lever 17 in a clockwise direction back to its original position removes all restraint from pointer 8, so that the latter is free to respond to subsequent impulses from pusher 7.

Also, provision is made so that pawl 20 is not disturbed and accidentally disengaged by returning lever 17 to normal, for when detent 18 again comes into contact with the hump 21 on pawl 20 during the return stroke of lever 17, pawl 21, which is equipped with a relatively stiff spring, causes detent 18 to lift away from pin 19 until detent 18 has passed over and cleared the hump 21 on pawl 20.

It will be evident from the foregoing description that the maximum demand since the time of last resetting will be indicated by pointer 8, and the maximum demand of the entire preceding billing period will be indicated by scale 13.

At the next resetting operation, a month later, the release of pawl 20 by lever 17 resets scale 13 to zero under the action of spring 23, thereby causing the record of the preceding billing period to disappear, and supplanting said indicated record by a new indicated value which is the maximum demand of the billing period just completed. In every case, as previously outlined, the resetting operation will affect the demand indications in the following order:

1. Return scale 13 to zero and cause the record of the preceding billing period to be obliterated;

2. Return pointer 8 to zero and cause the record of the demand of the billing period just finished to reappear on scale 13.

Ample opportunity for keeping permanent office records of the indicated demand is automatically provided for, since it will be required of the meter reader to take down and note the reading of the device before proceeding with the resetting operation. Since two resetting operations must be completed between the time a maximum demand indication first appears and the time that it is caused to disappear, the probability of lost readings is very small, because a demand reading noted from the position of pointer 8 at the end of one month automatically becomes the demand reading of scale 13 at the end of the next succeeding month.

Having described my invention, what I claim is:

1. In combination a demand actuated primary element, a first indicator movable by the primary element only in the advancing movement of said element, a second indicator, a manually operable reset member, and means operable under the initial movement of the reset member to move the second indicator to zero and operable under continued movement of the reset member to move the first indicator to zero and to move the second indicator from zero forward to a degree equal to the movement of the first indicator from its then indicating position back to zero.

2. In combination a demand actuated primary element, a primary indicator actuated in a forward direction only by said demand element, a second indicator, power means constantly tending to move the second indicator to zero, a restraining means for holding the second indicator against the action of said power means, a manually operable reset memebr, means operable upon initial movement of the reset member for releasing the restraining means to permit the power means to move the second indicator to zero, and means for thereafter moving the first indicator to zero and for moving the second indicator forwardly from zero to an indicating position to an extent equal to the reverse movement of the first indicator back to zero.

3. In combination a demand actuated primary element, a primary indicator actuated in a forward direction only by said demand element, a second indicator, power means constantly tending to move the second indicator to zero, a restraining means for holding the second indicator against the action of said power means, a manually operable reset member, means operable upon initial movement of the reset member for releasing the restraining means to permit the power means to move the second indicator to zero, and means operable upon the continued movement of the reset member for thereafter moving the first indicator to zero and for moving the second indicator forwardly from zero to an indicating position to an extent equal to the reverse movement of the first indicator back to zero.

4. In combination a demand actuated primary element, a primary indicator actuated in a forward direction only by said demand element, a second indicator, spring means constantly tending to move the second indicator to zero, a restraining means for holding the second indicator against the action of said spring means, a manually operable reset member, means operable upon initial movement of the reset member for releasing the restraining means to permit the spring means to move the second indicator to zero, and means operable upon the continued movement of the reset member for thereafter moving the first indicator to zero and for moving the second indicator forwardly from zero to an indicating position to an extent equal to the reverse movement of the first indicator back to zero.

5. In combination a demand actuated primary element, a primary indicator or pointer actuated in a forward direction only by said element, a fixed calibrated disc over which said pointer moves, a second indicator comprising a rotative calibrated disc, a portion of which is visible through a sight opening formed in the first named disc, power means tending to move the movable disc to zero indicating position at said sight opening, a restraining means for holding the movable disc against the action of said power means, a manually operable reset member, means operable upon initial movement of the reset member for releasing said restraining means to permit the power means to move the movable disc to zero indicating position, and means operable upon the continued movement of the reset member and after the completion of the movement of said movable disc to zero position to cause the reset member to engage the primary indicator and move it back to zero and simultaneously to cause the reset member to be engaged with the movable disc to move the same forwardly from zero indicating position an indicating distance equal to the indicating distance through which the primary indicator is moved after it is engaged by the reset member and in its return to zero indicating position.

6. A structure as recited in claim 5 in combination with stops for the movable disc so located that when said disc is moved under the influence of the power means to cause said stops to function said movable disc will be at zero indicating position with respect to the sight opening.

7. A device of the character described comprising a primary shaft, a crank-like pusher arm upon the end of said shaft, a fixed calibrated disc, a shaft concentric with said disc and with the first named shaft, mounted for rotation, a pointer frictionally mounted for swinging movement upon the last named shaft and having an end coacting with the calibrations of the said fixed disc, said pusher arm being adapted to engage a side of said pointer and move said pointer in the forward movement only of said pusher arm, a movable calibrated disc disposed in juxtaposition to and in rear of the fixed disc, said fixed disc being provided with a sight opening through which a portion of the movable disc is visible, power means tending to turn the movable disc and its shaft toward zero indicating position, a restraining means for the power means, a manually operable reset lever, and means actuated by the movement of said lever to first release the restraining means to permit the power means to move the movable disc to zero indicating position and to thereafter connect the pointer and movable disc with the reset lever so that upon continued movement of the reset lever the pointer will be moved back to zero position and the movable disc will be advanced from zero position to a corresponding degree.

8. In combination a primary demand shaft, a crank-like pusher arm thereon, a fixed calibrated disc having a sight opening therethrough, a movable calibrated disc mounted in the rear of said disc and a portion of which is visible through the sight opening of the fixed disc, a shaft by which the movable disc is carried, a ratchet wheel upon said shaft, a pointer frictionally mounted upon said shaft, said pointer coacting with the calibrations of the fixed disc and lying in the path of forward movement of the pusher arm, a spring tending to turn the shaft, ratchet wheel and movable disc toward zero indicating position of the movable disc, a pawl disposed to hold the ratchet wheel against such movement of the movable disc, a pawl upon the pointer, a spring tending to hold the last named pawl out of engagement with the ratchet wheel, a resetting crank-like member swingingly mounted upon the shaft by which the said ratchet wheel is carried, and a detent upon said member and arranged upon initial movement of said member to release the first named pawl from the ratchet wheel and permit the spring to move the movable disc to zero indicating position, said detent being likewise arranged upon continued movement of the resetting member to engage the second pawl and move it against the action of its spring into engagement with the ratchet wheel so that further movement of the resetting member will move said pawl bodily along with the pointer by which it is carried toward zero position of the pointer upon the fixed disc and also turn the ratchet wheel and movable disc to move the latter upscale from its zero position to a corresponding degree.

9. In combination a primary demand shaft, a second shaft separate from the demand shaft and lying in substantial alignment therewith, a fixed calibrated disc having a sight opening therethrough and concentrically disposed with respect to said shaft, a movable calibrated disc mounted in the rear of the fixed disc and a portion of which is visible through the sight opening of the fixed disc, said movable disc being concentric with and fast to said second shaft, a ratchet wheel upon said shaft, a pointer frictionally mounted upon said shaft said pointer coacting with the calibration of the fixed disc, means for imparting movement to said pointer from the primary demand shaft in an upscale direction only, a spring tending to turn the shaft ratchet wheel and movable disc toward zero indicating position of the movable disc, a fixed pawl disposed to hold the ratchet wheel against such movement of the movable disc, a pawl upon the pointer, a spring normally holding said pawl out of engagement with the teeth of the ratchet wheel, a resetting member swingingly mounted upon said second shaft, and a detent upon said member arranged to engage said first-named pawl upon initial movement of the resetting member to release the first-named pawl from the ratchet wheel and permit the spring to move the movable disc to zero indicating position, said detent being mounted to yield so as not to affect said pawl in the reverse direction of movement of the resetting member, said detent being so positioned that upon continued movement of the resetting member in its resetting operation, it engages the second pawl to move said second pawl into engagement with the teeth of the ratchet wheel, so that further movement of the resetting member will move said pawl bodily along with the pointer by which it is carried toward zero position of the pointer upon the fixed disc and also turn the ratchet wheel and movable disc to move the latter upscale from its zero position to a degree corresponding to the position of the pointer at the time of the engagement of the pointer-carried pawl with the teeth of the ratchet wheel.

RUDOLPH A. K. FLEISCHMANN.